United States Patent [19]
Briggs

[11] 3,935,101
[45] Jan. 27, 1976

[54] CLARIFICATION PROCESS
[75] Inventor: William Scott Briggs, Bellingham, Wash.
[73] Assignee: Georgia-Pacific Corporation, Portland, Oreg.
[22] Filed: July 22, 1974
[21] Appl. No.: 490,482

Related U.S. Application Data
[62] Division of Ser. No. 305,821, Nov. 13, 1972, Pat. No. 3,857,830.

[52] U.S. Cl. .................................. 210/47; 210/54
[51] Int. Cl.² ........................................ C02B 1/20
[58] Field of Search ............. 210/45, 47, 51, 52–54; 260/124 A, 124 B, 124 R

[56] References Cited
UNITED STATES PATENTS

| | | | |
|---|---|---|---|
| 2,200,784 | 5/1940 | Wallace | 210/54 |
| 3,149,085 | 9/1964 | Ball et al. | 260/9 |
| 3,850,799 | 11/1974 | Ludwig | 210/54 |

Primary Examiner—Charles N. Hart
Assistant Examiner—Peter A. Hruskoci
Attorney, Agent, or Firm—Peter P. Chevis

[57] ABSTRACT

A clarification process using a water-soluble lignin-di-epoxide composition as a flocculating agent is described. The lignin-di-epoxide compositions are prepared by cross-linking of lignin with a di-epoxide.

11 Claims, No Drawings

CLARIFICATION PROCESS

This is a division of application Ser. No. 305,821 filed on Nov. 13, 1972 Now U.S. Pat. No. 3,857,830.

This application relates to a clarifying process using novel lignin compounds as flocculating agents. More particularly, it pertains to using high molecular weight lignin compositions prepared by cross-linking of lignin with a di-epoxide as coagulants or flocculating agents.

One of the major contributors to pollution of streams and waterways is the effluent discharged into the waterways without proper treatment to remove the fine, colloidal particles of solids dispersed in the effluent. While the large particles may be settled out without difficulty, the fine solids do not settle and have to be treated with a flocculating agent or coagulant to coagulate or aggregate the particles before settling. Multivalent salts such as ferric chloride and aluminum sulfate are commonly used for particular systems but are of limited effectiveness even in the systems used. The more effective organic polyelectrolytes are relatively expensive and cannot be economically used in many applications.

The surface active properties of lignins and lignosulfonates have long been recognized, and these products have been used as dispersing and flocculating agents. While it was known for a number of years that high molecular weight lignin and lignosulfonate, such as obtained by fractionation or polymerization of pulping liquors, function as flocculating agents, these materials do not have sufficient effectiveness for commercial acceptance and are suggested for use mainly as flocculating aids in conjunction with other flocculating agents. Polymerization of lignosulfonates and the reaction of lignins with aldehydes and other reactants, such as disclosed in U.S. Pat. Nos. 3,470,148 and 3,600,308, have not improved the effectiveness of these materials to make them commercially attractive.

It is therefore the object of this invention to provide a clarification process for flocculation of solids suspended in an aqueous medium using improved flocculating agents prepared from lignin and lignosulfonates. A further object is to provide watersoluble lignin and lignosulfonate compositions which are effective flocculating agents. A still further object is to provide a method for the preparation of these compositions.

The above and other objects are obtained according to this invention by using as a flocculating agent a water-soluble lignindi-epoxide reaction product obtained by reacting a lignin with a long chain, terminal di-epoxide having a molecular weight in the range of from 120 to 1800 to the extent that the phenolic hydroxyl content of the lignin has been reduced from about 40% to 95%. By reacting the lignin with a limited amount of epoxide under controlled conditions, cross-linking or bridging of the lignin by long chains is obtained resulting in formation of molecules having large entities held together at a distance from each other by non-rigid, flexible bonding. These products when dissolved in aqueous medium form loosely bound, flexible molecules having increased area for adsorption or entrapment of fine solid or colloidal particles in the solution or suspension to result in the flocculation of these particles.

While the lignin may be reacted with the di-epoxide by the various known methods, it is essential that the reaction be carried out under controlled alkaline conditions to prevent the lignin from reacting with the di-epoxide to the extent that the reaction product becomes water-insoluble. The preferred method for cross-linking or bridging of the lignin molecules with the epoxide is to react the di-epoxide with the lignin in an aqueous lignin solution under alkaline conditions. The di-epoxides generally have limited solubility in water and are intermixed with the aqueous lignin solution to form a two-phase system or an emulsion. With the more viscous or solid di-epoxides, the di-epoxide may be dissolved in a water-immiscible organic solvent prior to intermixing with the lignin solution. Thus, the initial reaction of the lignin with the di-epoxide is effected at the interface of the two-phase system. Upon having one of the epoxides reacted with the lignin, the epoxide-reacted lignin generally remains soluble in the aqueous phase where the unreacted epoxy group then further reacts with lignin in the aqueous solution. The aqueous solution contains a high ratio of lignin to epoxide to effect the cross-linking. By the above procedure, the extent of reaction between the lignin and di-epoxide can be controlled to obtain the desired bridging or cross-linking without the reaction proceeding to insolubility. The reaction rate is controlled such that after the desired extent of reaction between the lignin and the di-epoxide is obtained, unreacted epoxide may be recovered from the reaction mixture. The reaction may also be effected in an alkaline, aqueous medium by using a water-miscible solvent for the epoxide, such as dioxane or a ketone or ether. The bridging or cross-linking reaction between the di-epoxide and the lignin is believed to be between the hydrogen of the phenolic hydroxyl radicals of the lignin and the epoxy group of the di-epoxide. The epoxide ring is opened with the lignin being attached to one of the carbon atoms of the ring through an ether linkage with the formation of a hydroxyl group on the second atom.

When the reaction is carried out with the lignin and the diepoxide in an organic solvent, solvents such as formamide and tetrahydrofuran may be used. Since there are only a limited number of organic solvents, unreactive with the di-epoxides, for alkali and alkaline earth metal salts of lignin, it may be convenient to convert the lignosulfonate to an amine salt, in a manner similar to that disclosed in U.S. Pat. No. 3,578,651, prior to reaction with the di-epoxide. The alkyl ammonium lignosulfonates are more soluble in a number of organic solvents. Pyridine, polychlorinated and brominated hydrocarbon solvents of from 1 to 3 carbon atoms such as chloroform, dichloromethane, di- or trichloroethane, trichloroethylene, perchloroethylene and the halogenated propanes may be used. Most of the trialkyl ammonium lignosulfonate salts and the di-epoxides are sufficiently soluble in these solvents to effect the reaction. Other solvents which may be used are dimethylformamide and ethers such as alicyclic ethers of from 4 to 5 carbon atoms as dioxane, tetrahydrofuran, and tdtrahydropyran, glycol diethers having from 4 to 10 carbon atoms, and phenolic ethers such as anisole and phenetole. The reaction is carried out in presence of a base which generally may be a tertiary organic amine such as pyridine, or dimethylbenzylamine or other base. An inorganic base such as sodium hydroxide or potassium hydroxide may also be used by being dispersed within the solvent. Generally, the solvent may contain a sufficient amount of moisture to maintain the desired alkaline conditions.

After the reaction, the ammonium salt can be converted to the sodium or calcium salt or any other metal salt desired prior to use as a flocculating agent.

Lignin is a polymeric substance of substituted aromatics found in plant and vegetable tissue associated with cellulose and other plant constituents. In the pulp and paper industry, lignincontaining materials such as wood, straw, corn stalks, bagasse, and other vegetable and plant tissues are processed to recover the cellulose or pulp. The residual pulping liquor containing the lignin as a by-product is thus one of the main sources of lignin. While there is some variation in the chemical structure of lignin, depending upon the plant from which lignin is obtained, the place where the plant is grown, and also upon the method used in recovery or isolation of the lignin from the plant tissue; the basic structure and properties of the lignin are similar; all containing the phenolic hydroxyls through which the cross-linking or bridging is effected. Thus, lignin obtained by any method or from any source may be used in this reaction as long as the lignin is in a form soluble in an alkaline medium.

Since the lignin separated from the plant may be chemically altered somewhat from that found in the plant, the term "lignin", as used herein, means the lignin product which is obtained upon separation from the cellulose or recovered from the plant. In the sulfate pulping process, the lignocellulosic material is digested with a bisulfite or sulfite resulting in the sulfonation of the lignin. In other methods of the recovery or separation of the lignin from the plant, the lignin may not be sulfonated but may be chemically altered somewhat in some other manner. For example, in residual pulping liquors obtained in the sulfate and other alkaline pulping processes, the lignin is present as an alkaline metal compound dissolved in the alkaline aqueous liquor. "Hydrolysis lignin" obtained from the hydrolysis of lignocellulosic materials in manufacture of sugar is likewise altered somewhat from that found in the plant but may be relatively insoluble and thus may have to be modified to solubilize the product before it can be used. Also, the lignin products such as a residual pulping liquor may be subjected to various treatments such as, for example, acid, alkaline or heat treatments or reacted with the other chemicals which may further alter somewhat the lignin constituents. The lignins remain operative as long as the treatment is not so severe as to destroy the basic polymeric structure or substantially reduce the phenolic hydroxyl content of the lignin.

The residual pulping liquors, or the lignin-containing product obtained in the separation or recovery of lignin from the plant, may contain other constituents besides the lignin. For example, in the sulfite pulping process, the spent sulfite liquor contains lignosulfonates, generally in an amount of 40 to 60 weight percent, which may be present as salts of cations, such as magnesium, calcium, ammonium, sodium and other cation which may have been present during the sulfonation of the lignin with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous type materials as well as other materials which are not removed by the hydrolysis. It is not necessary to separate the lignin-containing constituents from the other constituents. The lignin product as obtained containing all of the constituents may be used as such or subjected to different treatments such as alkaline, acid, or heat treatments as well as reacted with chemicals to modify or remove some of the non-ligneous constituents prior to reaction with the di-epoxide. The reaction of the di-epoxide with the non-lignin constituents is not excessive and the presence of the reaction products of these constituents does not materially effect the flocculating properties of the product. The non-lignin constituents are generally of relatively low molecular weight and can be easily removed from the final product after reaction, if desired. The lignin material may also be separated from the non-lignin containing products prior to reaction with the di-epoxide, as well as after reaction, using methods such as dialysis, gel permeation, and chemical precipitation as acid, calcium hydroxide, or amine precipitation, or alcohol or solvent extraction, and other methods well known in the art for fractionation and recovery of organic polyelectrolytes from lower molecular weight materials.

The di-epoxides reacted with the lignin are the "1,2-epoxides" or "alpha epoxides", containing 2 alpha or terminal epoxy groups or oxirane rings. The epoxides must be relatively long chained epoxides having a molecular weight in the range of 120 to 1800, preferably in the range of 250 to 800. The epoxides of molecular weight higher than 1800, while operative if reacted, are more difficult to react with the lignin to the necessary extent to obtain an effective flocculating agent. Although the linear, straightchained di-epoxides such as the diglycidyl ethers of aliphatic polyols or polyalkylene glycols are preferred, the di-epoxides do not have to be the alkylene or oxyalkylene epoxides. The chain may contain cyclic or aromatic groups such as, for example, substituted and non-substituted cyclohexylene, phenylene, biphenylene, naphthylene and other arylene groups of up to 12 carbon atoms substituted in the aliphatic chain. The chain may also contain linking atoms such as oxygen in ether linkages, nitrogen, or sulfur atoms. When cyclic or aromatic groups or other linking atoms are substituted in the chain, the oxirane groups must be separated from the substituted group or linking atom by at least one carbon atom so that each epoxy group is on the end of an alkylene group containing at least 3 carbon atoms to have the chain maintain its linear characteristics. Further the chain may also contain side chains as long as the side chains are of a size and number such that the epoxide does not lose its linear characteristics. The side chains may be alkyl groups or substituted and non-substituted aromatic or cyclic groups including groups containing nitrogen or sulphur as well as oxygen ether linkages. Generally the length of the side chains is less than 1/2 of the length of the main chain having the oxirane groups, and the total number of atoms of the side chains does not exceed the number of the atoms of the main chain. The nitrogen in the chains may be present as a tertiary amine radical or a quaternary ammonium salt with the alkyl radicals on the nitrogen being of from 1 to 4 carbon atoms in length with the total carbon atoms in the alkyl radicals on the nitrogen not exceeding about 8 carbon atoms. The most readily available di-epoxides are the diglycidyl ethers obtained by the reaction of the epichlorohydrin with polyhydric alcohols such as diols and polyalkylene glycols. The nitrogen containing diepoxides may be similarly prepared by reaction of epichlorohydrin with amines, such as disclosed, for example, in U.S. Pat. Nos. 3,091,537 and 3,189,459. In addition, the di-epoxides may also be prepared by the peroxide route such as the reaction of peracetic acid with di-olefins as well as dehydrohalogenation of chloroacetyls and other methods known in the art.

Illustrative examples of the more readily available epoxides which may be used are as follows:

1. Carbon-linked di-epoxides such as 1,2,7,8 -diepoxyoctane; 1,2,11,12 -diepoxydodecane; 1,2,7,8 - diepoxy - 4 -methyloctane; 1,2,7,8 - diepoxy - 4,5 dimethyloctane; and other epoxides having a general formula:

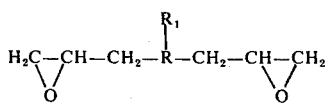

Where R represents alkylene radicals having up to 18 carbon atoms, arylene or oxy-linked arylene radicals having up to 12 carbon atoms and $R_1$ represents hydrogen, phenyl or one or more alkyl radicals such that the total carbon atoms of $R_1$ does not exceed ½ of the carbon atoms of the chain containing the oxirane groups.

2. Diglycidyl ethers of aromatic and aliphatic polyols and such as 1,4 - butanediol; 1,8 - octanediol; 1,12 - dodecanediol; glycerol, sorbitol; Bisphenol A; 2,5 - bis (hydroxymethyl) tetrahydrofuran; 1,4 - bis [2-(4'-hydroxyphenyl) ethyl] benzene; and dihydroxynaphthalene; and epoxides having a general formula:

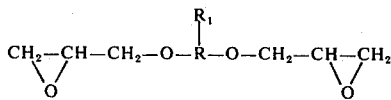

Where R represents alkylene radicals having up to 18 carbon atoms, arylene or oxy-linked arylene radicals having up to 12 carbon atoms, and $R_1$ represents hydrogen, phenyl or one or more alkyl radicals such that the total carbon atoms of $R_1$ is less than ½ of the carbon atoms of the chain containing the oxirane groups. 3. Diglycidyl ethers of polyalkylene glycols such as polyethylene glycol and polypropylene glycol and other epoxides having a general formula:

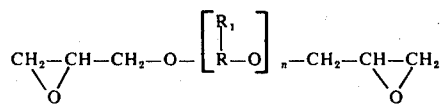

Where "n" is a positive integer of from 2 to 20, R represents alkylene radicals having from 2 to 4 carbon atoms, and $R_1$ represents hydrogen or alkyl radicals having from 1 to 2 carbon atoms with the total of R and $R_1$ not being greater than 4 carbon atoms. (4) Diglycidyl amines and amine salts such as N,N - bis (2,3 - epoxypropyl) methylamine; N,N - bis (2,3 - epoxypropyl) butylmethylammonium iodide; 1,4 - butylenebis [N - (2,3 epoxypropyl) - N,N - dimethylammonium iodide] and other epoxides having the general formula:

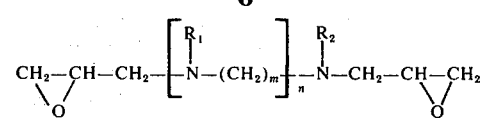

or

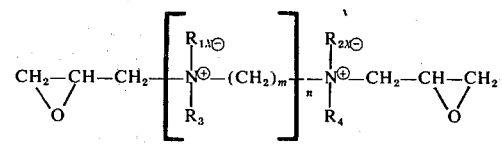

Where $m$ is a positive integer of from 2 to 5, $n$ is a positive integer from 0 to 5, $R_1$, $R_2$, $R_3$, and $R_4$ represent alkyl radicals having from 1 to 2 carbon atoms, and X represents bromide, iodide, arenesulfonate, or acetate ions.

The reaction of the lignin with the di-epoxide may be carried out by intermixing the di-epoxide with an alkaline aqueous lignin solution at a pH of from 8 to 13, preferably 9 to 11. Alkali metal hydroxides and carbonates, and alkaline earth metal hydroxides may be used for pH control of the aqueous solution. The lignin is present as an alkali or alkaline earth metal salt in the solution and must be at an initial concentration of at least 20 weight percent. Generally, a solution containing initially from 20 to 50 weight percent of solids is used with a solution containing from 30 to 40 weight percent solids being preferred. Solutions above 45 percent concentration are relatively viscous and more difficult to handle. In the preferred range, the solutions are of sufficient concentration to obtain the desired reaction at a practical rate and at a sufficiently low viscosity to permit relatively easy intermixing or emulsification with the diepoxide. As the reaction proceeds, the reaction mixture may have to be further diluted. For example, for most of the epoxides, the viscosity of the reaction mixture may increase rapidly as the di-epoxide reacts with the lignin to a point where the mixture gels. The reaction cannot be controlled under these conditions and may result in the insolubilization of the product. To overcome this difficulty, additional water or solvent is generally added to the reaction mixture diluting the concentration of the reaction product to permit agitation and to further the desired reaction. The addition of water or solvent is made periodically to maintain the reaction mixture as concentrated as possible without gelling. Usually, the reaction is continued under viscous conditions, for example, at from about 5000 to 10000 centipoises under the temperature and shear conditions of the reaction. The reaction mixture generally is thixotropic so that the extent of dilution necessary will vary somewhat as to the type and extent of mixing employed in effecting the reaction. For example, when the reaction is carried out with a high degree of mixing such as would be obtained in the blender, the reaction may be carried out under higher concentrations than when a relatively slow mixer is used. If the mixture is diluted too rapidly, the necessary extent of cross-linking may not be obtained. By carrying out the reaction under high viscous conditions, the dilution may be made to the extent that the concentration of the final product may be reduced to below 20 percent and may be as low as 15 or so. However, usually dilution to about 20 is sufficient in most cases to obtain the desired extent of interaction without insolubilizing a large portion of the reaction product.

Generally, the epoxide is intermixed with the lignin solution in a ratio to obtain from about 0.5 to over 1.3 epoxy group for each phenolic hydroxyl group on the lignin. The reaction is carried out at a temperature in the range of 50° to 220°C, preferably in the range of 75°C to the reflux temperature of the mixture at atmospheric pressure, until from 40 to 95 percent of the phenolic hydroxyl groups on the lignin have been reacted. Products reacted with sufficient amount of di-epoxide to reduce the phenolic hydroxyl content of the lignin by from 50 to 75 percent are preferred. The flocculating properties improve with increased reaction with the di-epoxide until about 60 to 70 percent of the phenolic hydroxyl on the lignin has been reacted at which point further reaction may not necessarily further improve the flocculating properties. When the amount of di-epoxide reacted exceeds the amount equivalent to satisfy the phenolic hydroxyls on the lignin, the product may become insoluble even with dilution of the reaction mixture. The insoluble portion has limited effectiveness as a flocculating agent. In the reaction, the amount of the epoxide intermixed with the lignin can be greater than that desired for the reaction. The reaction takes place at a controlled rate so that all of the epoxide does not have to be reacted with the lignin and the unreacted reacted and unhydrolyzed epoxide can be recovered from the reaction mixture. Generally, the amount added is in a small excess of the amount of epoxide desired to be reacted with the lignin and the reaction carried out until most of the di-epoxide has been reacted. The length of time required to react the epoxide depends upon the reaction conditions employed. For reaction temperatures in the preferred range, generally a reaction time of from 1 to 4 hours is sufficient. However, the reaction time may be varied from 15 minutes to 24 hours or longer. At the preferred reaction temperature, generally products with optimum flocculating properties are obtained with a reaction time of from 1 to 4 hours. Prolonging the reaction time does not necessarily improve the effectiveness of the product. For example, a product reacted for 2 to 4 hours may have a settling time of about 60 seconds in flocculation of a dispersion which may increase to about 80 seconds if the reaction time in preparation of the product is extended to 19 or 20 hours.

After the di-epoxide has been reacted with the lignin, the reaction mixture as obtained may be used as a flocculating agent. The reaction mixture may also be purified to recover the lignindi-epoxide product by separating the unreacted di-epoxide or organic phase from the aqueous phase, especially if the recovery of the unreacted di-epoxide is desired. The phases may be separated by intermixing a water-immiscible organic solvent with the reaction mixture to extract the di-epoxide and permitting the phases to separate. However, the separation may be more rapidly effected by centrifuging the reaction mixture containing the diepoxide solvent. The aqueous phase thus obtained may be further processed to recover the epoxide-lignin reaction product from the remaining constituents, these constituents being mainly the diepoxide reaction products of the low molecular weight, non-ligneous constituents of the lignin and inorganic salts. The high molecular weight constituents can be recovered by the well known methods used for fractionation or recovery of high molecular weight polyelectrolytes. The unreacted di-epoxide may be recovered from the organic phase and reused.

In using the lignin-di-epoxide composition, the same procedures and methods employed for other polyelectrolytes or high molecular weight flocculating agents can be used. The products may be used by themselves or in conjunction with other agents. They are effective in acid, neutral, or alkaline conditions for flocculation of relatively dilute dispersions containing less than 0.1% of solids to more concentrated dispersions containing from 4% to 10% or higher of solids and may be used in various amounts varying generally from less than 1 part per million to 1000 parts per million depending upon the system being treated. For the flocculation of inorganic particles such as finely dispersed clay or sediment, an amount of from 10 to 30 parts per million usually may be employed to obtain effective flocculation. The products are also effective under acid conditions in flocculating finely dispersed organic material such as proteins. Generally the flocculating time does not decrease too rapidly when the amount of the flocculating agent used is increased above about 10 to 30 parts per million. For example, a dispersion which may be flocculated in about 60 seconds with 10 parts per million of the flocculating agent may have a floc time of about 50 to 55 seconds with 100 parts per million. A somewhat greater variation in flocculating times than above may be obtained at the lower levels with the higher molecular weight flocculating agents cross-linked with the longer chained di-epoxides, such as diglycidyl ethers of polyalkylene glycols. For these products, the settling time may decrease from about 55 seconds to 35 seconds upon the increase of dosage from 10 parts per million to 100 or more parts per million. Products cross-linked with the shorter di-epoxides are also more sensitive to the pH of the system being treated. For example a product prepared by cross-linking a lignosulfonate with a diglycidyl ether of polyethylene glycol may be relatively independent of pH in the range of from about 4.5 to 10 especially in the presence of electrolyte normally found in the effluents or streams. However, lignosulfonate cross-linked with the shorter di-epoxides, such as the diglycidyl ether of the butanediol, may be somewhat less effective under alkaline conditions than under acid conditions and higher dosages may be desirable.

The following examples further illustrate the invention.

EXAMPLE I

A fermented calcium base spent sulfite liquor was dialyzed as a 30 weight percent aqueous solution against water using a polyvinyl alcohol membrane. A dialyzate fraction containing about 74 weight percent of the spent sulfite liquor solids was obtained which was then base exchanged with sodium sulfate to convert the calcium lignosulfonate dialyzate to the sodium base and to precipitate the calcium sulfate. The sodium base lignosulfonate was adjusted to a pH of 11 by addition of sodium hydroxide and spray dried. The spray dried sodium lignosulfonate, in an amount of 20.0 grams (97% solids), was dissolved in distilled water to obtain an aqueous solution having a pH of 9.4 containing about 39 percent solids. The lignosulfonate solution was reacted with 1,4-butanediol diglycidyl ether in a 250 milliliter, 3 neck, round bottom flask. The 1,4-butanediol diglycidyl ether had a molecular weight of about 135 per epoxide and was dissolved in an amount of 2.4 grams in 20 milliliters of trichloroethylene prior to intermixing with the lignosulfonate solution. The ratio of the epoxide groups to the phenolic hydroxyl groups of the lignosulfonate was 0.8:1. The two-phase system was heated to reflux temperature with vigorous stirring of the reaction mixture to emulsify the trichloroethylene solution of the di-epoxide with the aqueous lignosulfonate solution. The emulsion then was maintained at a temperature in a range of 75° to 80°C on a steam bath for 4 hours, while being agitated, to obtain a gold-brown reaction mixture. The reaction mixture was centrifuged at 10,000 r.p.m. to separate the organic and aqueous phases. The organic phase was diluted with 75 milliliters of acetone to precipitate any lignin product in the organic layer or in the small amount of emulsion remaining intermixed with the organic layer. The small amount of precipitate was removed by filtration. The filtrate was dried over anhydrous magnesium sulfate and evaporated at 50°C at 25 millimeters of pressure absolute to recover the unreacted di-epoxide.

The aqueous layer recovered from the organic layer was dialyzed continuously against running water for 117 hours using a regenerated cellulose dialysis casing. Evaporation of the dialyzate in a forced-air oven at 40°C gave 16.1 grams of dark, golden-brown product. Analytical data of the lignosulfonate prior to reaction with the di-epoxide and of the product are shown in the table below:

| Analysis | Sodium Lignosulfonate Reactant | Lignosulfonate Di-epoxide Product |
|---|---|---|
| Methoxyl, wt % | 10.7 | 12.1 |
| Strong acids, meq/g | 1.9 | 1.6 |
| Weak acids, meq/g | 1.2 | 0.47 |
| Carboxylic acid, wt % | 2.2 | 1.0 |
| Phenolic hydroxyl, wt % | 2.1 | 0.95 |

The methoxyl content of the lignosulfonate and the product was determined by the Ziesel method as described in *Organic Analysis* by John Mitchell, Jr., et al, Volume I, Page 93, Interscience, New York (1953). The phenolic hydroxyl content was determined by the procedure of Otto Goldschmid, "Determination of Phenolic Hydroxyl Content of Lignin Preparations by Ultra-violet Spectrophotometry", *Analytical Chemistry*, 26, p. 1421 (1954). The strong acid, weak acid, and the carboxylic acid content were determined by conductometric titration.

The lignosulfonate-di-epoxide composition was tested as a flocculating agent in the flocculation of clay in an aqueous system at a pH of 5. A commercially available low-yield clay (Panther Creek) was dispersed in water to obtain a dispersion containing about 4 weight percent of clay. Sodium chloride was also added in an amount of about 1,000 parts per million. The test was carried out by inverting and shaking 100 milliliter samples of the clay suspension in a 100 milliliter graduated cylinder and then noting the time taken for the boundary line of the clay to settle to half-volume or 50 milliliter mark on the cylinder. The settling time for the lignosulfonate-di-epoxide product was thus determined when the flocculating agent was added in an amount of about 10 parts per million. The results obtained were compared to the flocculating time required for the clay to settle to the half-volume mark without the addition of the lignosulfonate. The results obtained are shown in the table below.

| Sample | Amount Added, p.p.m. | Settling Time Secs. |
|---|---|---|
| Blank | — | 430 |
| Lignosulfonate-di-epoxide product | 10 | 85 |

EXAMPLE II

A sodium lignosulfonate prepared from a fermented calcium base spent sulfite liquor in a manner similar to that described above was reacted with 1,4-butanediol diglycidyl ether at various reaction times. The lignosulfonate in an amount of 21 grams was dissolved in 30 milliliters of distilled water to obtain a lignosulfonate solution containing about 40% solids. The solution was intermixed with 2.4 grams of 1,4-butanediol diglycidyl ether which amount was the equivalent to 0.8 epoxy group for each of the phenolic hydroxyl groups in the lignosulfonate solution. In one of the samples, the di-epoxide was dissolved in 3 milliliters of trichloroethylene prior to intermixing with the solution. The two-phase reaction mixture was heated on a steam bath and reacted at a temperature in the range of 70° to 76°C for 4 hours while the reaction mixture or emulsion was continually stirred. Additional distilled water and trichloroethylene were added periodically to the reaction mixture as the reaction proceeded to dilute the reaction mixture to maintain it stirrable. A total of 32 milliliters of additional water and 23 milliliters of additional trichloroethylene was added. At the end of 4 hours, the reaction mixture was cooled and the mixture was tested as a flocculating agent without the recovery of the lignosulfonate-di-epoxide product. The flocculation test was similar to that described above in Example I. The crude product was added to the 100 milliliters of clay suspension in an amount of about 2 to 3 drops which represented an addition of the lignosulfonate-di-epoxide product in an amount of from 10 to 20 parts per million. The settling time to settle the clay to a half-volume was 67 seconds.

The cooled reaction mixture was intermixed with 50 milliliters of ether to extract the unreacted di-epoxide and centrifuged to separate the aqueous phase from the organic phase. The organic phase was diluted with about 100 milliliters of acetone to precipitate any lignin product from the organic phase and the small amount of emulsion dispersed in the organic phase. The organic phase then was dried and upon evaporation 0.8 gram of unreacted di-epoxide was recovered.

The aqueous layer was dialyzed continuously against running water in a regenerated cellulose casing, then air dried at 25°C to obtain 15.0 grams of lignosulfonate-di-epoxide product. The di-epoxide product upon being tested as a flocculating agent in a manner described above at a usage of 10 parts per million had a settling time of 86 seconds.

A second run was made where the lignosulfonate was reacted with 1,4-butanediol diglycidyl ether in a manner similar to the procedure described above except that the 1,4-butanediol diglycidyl ether was intermixed with the lignosulfonate solution directly without the use of the organic solvent. The reaction was carried out by heating the reaction mixture for 5 hours on a steam bath at a temperature of about 70°C. At the end of 5 hours, approximately 62% of the phenolic hydroxyls on the lignosulfonate had been reacted and the reaction mixture when tested as a flocculating agent had a flocculating time of 54 seconds. Upon ether extraction and centrifuging the reaction mixture, 0.3 gram of unreacted diepoxide was recovered from the organic phase and after dialysis 16.3 grams of the lignosulfonate-diepoxide product was recovered from the aqueous phase. The purified product when tested as a flocculating agent at a procedure described in Example I gave a flocculation time of 80 seconds at a dosage of 10 parts per million.

Further, a third run was made similar to that described above wherein the 1,4-butanediol diglycidyl ether was dissolved in 3 milliliters of trichloroethylene and the reaction carried out for a total of 19.3 hours. During the reaction, water was periodically added to a total of 75 milliliters. No additional trichloroethylene was added. After the lignosulfonate solution was reacted with the trichloroethylene solution of 1,4-butanediol diglycidyl ether for about 1.5 hours, a small sample of the reaction mixture was withdrawn and tested as a flocculating agent. The procedure used for testing the crude product was similar to that described for testing the reaction mixture above utilizing about 2 to 3 drops of the reaction mixture for 100 milliliters of the clay suspension. The flocculation time obtained was about 70 seconds. After a reaction time of 3.5 hours, the flocculation time was 59 seconds. Upon continuing the reaction for a total period of 19.3 hours, the flocculation time for the reaction mixture was 78 seconds.

EXAMPLE III

A sodium lignosulfonate similar to that above was reacted with polyethylene glycol diglycidyl ether. The polyethylene glycol diglycidyl ether had an average molecular weight of about 290 per epoxide.

The polyethylene glycol diglycidyl ether was reacted with the lignosulfonate solution in a manner described above wherein the di-epoxide was dispersed in about 40 weight percent concentration lignosulfonate solution without the use of any organic solvent. The polyethylene glycol diglycidyl ether was added in an amount to obtain a ratio of 0.8 epoxy group for each phenolic hydroxyl of the lignosulfonate. The reaction mixture was heated and reacted on a steam bath for about 4.1 hours at a temperature of 75° to 85°C. Water in a total amount of about 149 milliliters was added periodically to the reaction mixture as the viscosity of the mixture increased upon the reaction of the lignosulfonate with the di-epoxide. The aqueous phase was recovered by extraction and centrifugation, dialyzed, and dried in the manner described above. The intrinsic viscosity of the product, determined in a 0.1 N sodium chloride solution, was 0.33 dlg$^{-1}$.

The product obtained was tested as a flocculating agent at several dosage or usage levels using the procedure and clay suspension described above. Some flocculation tests were also made wherein the clay suspension was adjusted to a pH of 9 by addition of sodium hydroxide and the sodium chloride content was increased to 4,000 parts per million. The results obtained are shown in the table below:

| Amount of Product Added, p.p.m. | Settling Time, Sec. | | | |
| --- | --- | --- | --- | --- |
| | Clay Suspension at pH 5 | | Clay Suspension at pH 9 | |
| | 1000 parts NaCl | 4000 parts NaCl | 1000 parts NaCl | 4000 parts NaCl |
| 1 | — | 230 | — | 357 |
| 10 | 57 | 61 | 51 | 55 |
| 20 | — | — | — | 46 |
| 50 | 35 | 39 | 38 | 39 |
| 100 | — | 35 | — | 37 |
| 200 | 31 | — | — | 37 |
| 500 | 27 | — | — | — |
| 1000 | 31 | — | — | — |

The product was also tested using 10,000 parts per million of the product in the suspension at a pH of 5 containing 1000 parts per million of sodium chloride. Large flocs were formed upon addition of the large amount of product which settled immediately to form a gelatinous precipitate or sludge.

The flocculating time obtained by using 10 parts per million of commercially available polyelectrolyte, Separan AP 30, a partially hydrolyzed polyacrylamide manufactured by the Dow Chemical Company, gave flocculating times of 18 and 19 seconds at pH of 5 and 9, respectively.

EXAMPLE IV

A sodium base lignosulfonate prepared from a fermented dialyzed calcium base spent sulfite liquor was reacted with a polypropylene glycol diglycidyl ether having an equivalent weight of about 190 per epoxide.

The sodium lignosulfonate in an amount of 20 grams was dissolved in 30 milliliters of water in a 3-necked flask. To this solution, 3.4 grams of polypropylene glycol diglycidyl ether were added which gave a ratio of 0.85 epoxy group for each phenolic hydroxyl of the lignin. The mixture was reacted while being stirred under reflux at a temperature of about 86°C. Water was periodically added to the reaction mixture after a reaction time of about 13 minutes to dilute the reaction mixture to maintain stirrability. A total of about 100 milliliters of water was thus added during the 75 minute reaction time.

After the reaction, the reaction mixture was neutralized, extracted with ether and centrifuged to separate the aqueous phase from the organic phase. The product was not dialyzed. About 0.1 gram of unreacted epoxide was recovered. The cross-linked lignin product obtained was tested as a flocculating agent and the results obtained are shown in Table I below.

EXAMPLE V

A sodium base lignosulfonate similar to that of Example IV above was reacted with a polypropylene glycol diglycidyl ether which had an equivalent weight of about 325 per epoxide. A ratio of about 0.85 epoxide groups per phenolic hydroxyl of the lignin was obtained by adding 5.8 grams of the polypropylene glycol diglycidyl ether to a sodium lignosulfonate solution obtained by dissolving 20 grams of the sodium lignosulfonate in 30 milliliters of water. The mixture was reacted for 6.2 hours at a temperature of about 88°C. About 40 milliliters of additional water was added during the reaction to dilute the reaction mixture to maintain stirrability. After the reaction, the reaction mixture was neutralized, extracted with ether, and centrifuged to separate the organic phase from the aqueous phase containing the cross-linked lignin. Approximately 0.1 gram of the epoxide was recovered. The product obtained was tested as a flocculating agent and the results are given in Table I below.

EXAMPLE VI

A sodium lignosulfonate prepared from a fermented, dialyzed calcium base liquor was cross-linked with a diglycidyl ether prepared by reacting a polyethylene glycol having an average molecular weight of 600 with epichlorohydrin. The product had an average molecular weight of 715 per epoxide. The sodium base lignosulfonate in an amount of 10 grams was dissolved in 15 milliliters of water to obtain a 40 weight percent solution at pH 10.2. The solution was reacted with 8.1 grams of the high molecular weight polyethylene glycol diglycidyl ether at a temperature of about 86° for 3 hours and 10 minutes. A total of 80 milliliters of additional water was added during the reaction. After the reaction, the reaction mixture was neutralized, extracted with the ether, and centrifuged. The cross-linked lignosulfonate was tested as a flocculating agent. The details and results are given in Table I below.

EXAMPLE VII

A sodium base lignosulfonate converted from a dialyzed, fermented, calcium base liquor similar to that of Example VI was cross-linked with a di-epoxide prepared by reacting 1,7-octadiene with chloroperoxybenzoic acid in chloroform. The product had an average molecular weight of about 270 per epoxide.

The sodium lignosulfonate in an amount of 20 grams was dissolved in 30 milliliters of water to obtain a solution at pH 10.2. To this solution, 7.1 grams of the di-epoxide were added and the mixture reacted at a temperature of from 80° to 85° for 3 ½ hours. During the reaction time, about 100 milliliters of water were added to thin the reaction mixture as it thickened upon the cross-linking of the lignosulfonate. The reaction mixture was purified in a manner similar to that described above. About 0.5 gram of epoxide was recovered. The cross-linked lignosulfonate was tested as a flocculating agent. The results and details are given in Table I below.

EXAMPLE VIII

In a manner similar to that described in Example VII above, the sodium base lignosulfonate was reacted with diglycidyl ether which had an equivalent weight per epoxide of about 73. To 20 grams of the sodium lignosulfonate, 1.3 grams of diglycidyl ether were added. After the reaction, 0.1 gram of the epoxide was recovered. The product obtained was tested as a flocculating agent and the details and results are shown in the table below.

EXAMPLE IX

The sodium base liquor of Example VII was cross-linked with a Bisphenol A diglycidyl ether which had an equivalent weight per epoxide of about 190. To 20 grams of the sodium lignosulfonate, 3.4 grams of the Bisphenol A diglycidyl ether were added. About 0.2 gram of epoxide was recovered after the reaction. The product obtained was tested as a flocculating agent and the details and results are given in Table I below.

EXAMPLE X a. A sodium base spent sulfite liquor was reacted with 1,4-butanediol diglycidyl ether to cross-link the lignosulfonate in the spent sulfite liquor. The sodium base spent sulfite liquor was prepared from a fermented undialyzed calcium base spent sulfite liquor by reaction with sodium sulfate to precipitate out the calcium sulfate. The sodium base liquor thus obtained was adjusted to a pH of 11 with sodium hydroxide and then spray dried.

The undialyzed sodium base spent sulfite liquor solids in an amount of 20 grams were dissolved in 30 milliliters of water. To the solution, 1,4-butanediol diglycidyl ether was added in an amount of 3.5 grams which gave a ratio of 1.2 epoxy groups per each phenolic hydroxyl group of the lignosulfonate. The reaction mixture was reacted for 73 minutes at a temperature of about 90°C during which time 43 milliliters of additional water were added. After the reaction, the reaction mixture was purified in the manner described above. About 0.2 gram of unreacted epoxide was recovered. Based upon the phenolic hydroxyl analysis before and after reaction, about 50% of the phenolic hydroxyl had reacted. The cross-linked lignosulfonate was tested as a flocculating agent and the details and results are given in Table I below.

b. In a run similar to that above, a sodium base spent sulfite liquor prepared from a dialyzed calcium base spent sulfite liquor was cross-linked with 1,4 - butanediol diglycidyl ether in an amount which gave a ratio of 0.86 epoxy group per each phenolic hydroxyl of the lignosulfonate. The reaction was carried out at 90°C for 4 hours. Water was periodically added to the reaction mixture to keep the reaction mixture from gelling. The product obtained was cooled, ether extracted, and centrifuged to obtain the reaction product. The product was tested as a flocculating agent at 10 parts per million. The results obtained and other details are shown in the table below.

c. In a manner similar to Run (b) above, a similar run was made wherein the 1,4 - butanediol diglycidyl ether was reacted with the sodium base lignosulfonate in a water-dioxane solution in which both the lignosulfonate and di-epoxide were soluble.

Twenty grams of the spent sulfite liquor were dissolved in 25 grams of distilled water to which was then added 6 milliliters of 1,4 - dioxane. After the addition of the dioxane, 2.4 grams of the di-epoxide were added which gave a ratio of 0.86 grams epoxy group per each phenolic hydroxyl group of the lignosulfonate. The reaction mixture was placed on the steam bath and reacted at a temperature of about 90° for 4 hours. Water was periodically added to the reaction mixture until a total of 100 milliliters of additional water had been added. The reaction thickened rapidly and after about a 10 minute reaction time, addition of water had to be made every few minutes for about the next 20 minutes in which time the 100 milliliters of water were added. After about 30 minutes of reaction time, no further additions of water were made but the reaction continued for an additional 3 ½ hours. After the reaction, the solution was cooled to room temperature, ether extracted, and centrifuged. Unreacted epoxide in an amount of 0.2 gram was recovered from the ether extract. The water solution was evaporated under vacuum to remove the remaining ether and tested as a flocculating agent at 10 parts per million. The results and other details are given in the table below.

EXAMPLE XI

A sodium base lignosulfonate prepared from a fermented dialyzed calcium base liquor was reacted with a low molecular weight fraction of a di-epoxide prepared by reacting ethyleneglycol with epichlorohydrin. The diglycidyl ether had an equivalent weight of 105 per epoxide and was reacted in an amount of 1.9 grams with 20 grams of the sodium lignosulfonate in 30 milliliters of water. The mixture was reacted while being stirred at a temperature of about 90°C for 75 minutes. An additional amount of water of about 50 milliliters was added during the reaction. Upon purification of the reaction mixture in a manner similar to that described above, about 0.1 gram of the unreacted epoxide was recovered. The cross-linked lignosulfonate was tested as a flocculating agent and the details and results are given in Table I below.

EXAMPLE XII

The sodium lignosulfonate of Example IX was cross-linked with a higher molecular weight fraction of the di-epoxide prepared as described in Example XI above. This fraction had an equivalent weight of 117 as compared to 105 of the example above. The reaction was carried out in the manner similar to that of Example XI. The cross-linked lignosulfonate was tested as a flocculating agent. The results and details are given in Table I below.

EXAMPLE XIII

A kraft lignin was cross-linked with 1,4-butanediol diglycidyl ether. The alkali lignin in an amount of 20 grams was dissolved in 50 milliliters of water to obtain a solution at pH 8.5. To the solution, 7.2 grams of 1,4-butanediol diglycidyl ether were added. The alkali lignin had a phenolic hydroxyl content of about 6% so that the amount of the butanediol diglycidyl ether added represented about 0.75 epoxy group per phenolic hydroxyl of the lignin. The mixture was reacted at a temperature of 85° to 90°C for about 65 minutes. Additional water was added periodically during the reaction mixture until a total amount of about 100 milliliters had been added.

After the reaction, the reaction mixture was neutralized and extracted with ether to recover about 0.2 gram of unreacted epoxide from which it was estimated that about 70% of the phenolic hydroxyl of the lignin had reacted. The aqueous layer containing the cross-linked lignin was tested as a flocculating agent using the method described above. The results are shown in Table I below.

EXAMPLE XIV

A sodium base spent sulfite liquor was reacted with N,N - bis (2,3 - epoxypropyl) dimethylammonium iodide to cross-link the lignosulfonate in the spent sulfite liquor. The sodium base spent sulfite liquor was prepared in the manner described above wherein a fermented dialyzed calcium base liquor was reacted with sodium sulfate to convert the spent sulfite liquor to sodium base be precipitating out the calcium sulfate. The sodium base liquor thus obtained was adjusted to a pH of 11 with sodium hydroxide and then spray dried.

The spray dried sodium base spent sulfite liquor in an amount of 5 grams was dissolved in 7.5 milliliters of distilled water in a 3-necked round bottom flask equipped with a condenser. The N,N - bis (2,3 - epoxypropyl) dimethylammonium iodide was added in an amount of 0.75 gram in 4.6 milliliters of water which gave a ratio of 0.86 epoxy group per each phenolic hydroxyl group on the lignosulfonate. The mixture was reacted at a reaction temperature of 94°C for about 4 hours. After the reaction had proceeded for about 10 minutes, the viscosity increased to the extent that an additional 4 milliliters of water was added to dilute the reaction mixture to permit stirring. A total of 14 milliliters of water was thus added periodically in 5 steps. At the end of the reaction, the sample was cooled, blended with additional water, and centrifuged to obtain approximately 0.2 gram of a water insoluble product when dried. The water soluble portion obtained was tested as a flocculating agent at 10 parts per million. The results are shown in the table below.

In Table I, the flocculating tests were made on the flocculation of clay in an aqueous system. The tests were similar to that described in Example I except that 4,000 parts per million of sodium chloride were added to the 4 weight percent clay slurry. The test was performed in the manner described above wherein a 100 milliliter sample of the clay suspension was shaken in a 100 milliliter graduated cylinder and the length of time for the clay to settle to half volume or the 50 milliliter mark on the cylinder was noted and taken as the settling time. The flocculating agent was used in an amount of 10 parts per million and the slurry was at a pH of about 5. The intrinsic viscosities were determined in a 0.1 N sodium chloride solution.

The results of the above noted products were compared to a blank where the clay slurry was settled without the addition of any flocculating agent and to a second blank to which a dialyzed sodium lignosulfonate without being cross-linked was added in an amount of 10 parts per million.

TABLE I

| Example | Di-epoxide Reacted | Ratio of Epoxy Groups Per Phenolic Hydroxyl of Lignin | Percent of Phenolic Hydroxyls Reacted | Intrinsic Viscosity, dlg$^{-1}$ | Settling Time, Sec. |
|---|---|---|---|---|---|
| IV | Polypropylene glycol diglycidyl ether (MW per epox- | | | | |

TABLE I-continued

| Example | Di-epoxide Reacted | Ratio of Epoxy Groups Per Phenolic Hydroxyl of Lignin | Percent of Phenolic Hydroxyls Reacted | Intrinsic Viscosity, dlg$^{-1}$ | Settling Time, Sec. |
|---|---|---|---|---|---|
|  | ide=190) | 0.85 | 60 | 0.13 | 67 |
| V | Polypropylene glycol diglycidyl ether (MW per epoxide=325) | 0.85 | 49 | 0.25 | 103 |
| VI | Polyethylene glycol diglycidyl ether (MW per epoxide=715) | 1.1 | — | — | 69 |
| VII | 1,7-diepoxyoctane (MW per epoxide=270) | 1.2 | — | 0.20 | 102 |
| VIII | Diglycidyl ether | 0.86 | 70 | 0.23 | 104 |
| IX | Bisphenol A diglycidyl ether | 0.86 | 58 | 0.23 | 133 |
| X (a) | Butanediol diglycidyl ether | 1.2 | 50 | — | 83 |
| (b) |  | 0.86 | 65 | 0.33 | 83 |
| (c) |  | 0.86 | 67 | 0.27 | 87 |
| XI | Polyethylene glycol diglycidyl ether (MW per epoxide=105) | 0.86 | 59 | 0.17 | 117 |
| XII | Polyethylene glycol diglycidyl ether (MW per epoxide=117) | 0.85 | 61 | 0.27 | 100 |
| XIII | Butanediol diglycidyl ether | 0.75 | 70 | — | 135 |
| XIV | N,N-bis(2,3-epoxypropyl)dimethylammonium iodide | 0.86 | 63 | 0.24 | 104 |
| Blank I |  | — | — | — | 430 |
| Blank II | (dialyzed lignosulfonate) | — | — | — | 450 |

What is claimed is:

1. In a process for the clarification of an aqueous suspension of solid particle matter wherein a flocculating agent is added in a sufficient amount to flocculate the suspended particle matter the improvement which cimprises using as a flocculating agent a water-soluble lignin-di-epoxide reaction product obtained by reacting at a pH in range of 8-13 and a temperature in the range of 50° to 220°C a lignin solution containing 20–50 percent lignin with a long-chained di-epoxide having a molecular weight in the range of 120 to 1800 to the extent that the phenolic hydroxyl content of the lignin has been reduced from 40 to 95%, said di-epoxide having linking atoms selected from the group consisting essentially of carbon, nitrogen, sulfur, and oxygen and being a terminal di-epoxide with epoxy groups being on the terminal ends of the long chain, said terminal ends being alkylene groups of at least 3 carbon atoms.

2. A process according to claim 1 wherein the flocculating agent is a lignosulfonate-di-epoxide reaction product.

3. A process according to claim 1 wherein the flocculating agent is an alkali lignin-di-epoxide reaction product.

4. A process according to claim 1 wherein the flocculating agent is obtained by dissolving the lignin in an aqueous medium to form a solution containing from 20 to 50 weight percent lignin, intermixing the lignin solution at a pH in the range of 8 to 13 with the di-epoxide to react the di-epoxide with the lignin.

5. A process according to claim 4 wherein the di-epoxide is selected from the group consisting essentially of the following di-epoxides:

1. 1,2,7,8 - diepoxyoctane; 1,2,11,12 - diepoxydodecane; 1,2,7,8 - diepoxy - 4 - methyloctane; 1,2,7,8 - diepoxy - 4,5 - dimethyloctane; and di-epoxides having a general formula:

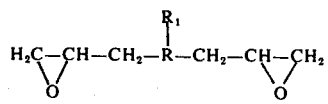

Where R represents alkylene radicals having up to 18 carbon atoms, arylene or oxy-linked arylene radicals having up to 12 carbon atoms and $R_1$ represents hydrogen, phenyl or one or more alkyl radicals such that the total carbon atoms of $R_1$ does not exceed ½ of the carbon atoms of the chain containing the oxirane groups.

2. Diglycidyl ethers of 1,4 - butanediol; 1,8 - octanediol; 1,12 - dodecanediol; glycerol, sorbitol; Bisphenol A; 2,5 - bis (hydroxymethyl) tetrahydrofuran; 1,4 - bis [2-(4'-hydroxyphenyl) ethyl] benzene; and dihydroxynaphthalene; and di-epoxides of other aromatic and aliphatic polyols having a general formula:

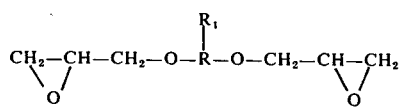

Where R represents alkylene radicals having up to 18 carbon atoms, arylene or oxy-linked arylene radicals having up to 12 carbon atoms, and $R_1$ represents hydrogen, phenyl or one or more alkyl radicals such that the total carbon atoms of $R_1$ is less than ½ of the carbon atoms of the chain containing the oxirane groups.

3. Diglycidyl ethers of polyalkylene glycols having a general formula:

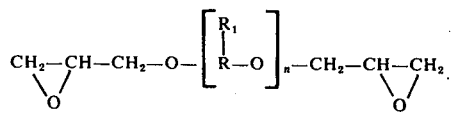

Where $n$ is a positive integer of from 2 to 20, R represents alkylene radicals having from 2 to 4 carbon atoms, and $R_1$ represents hydrogen or alkyl radicals having from 1 to 2 carbon atoms with the total of R and $R_1$ not being greater than 4 carbon atoms.

4. N,N - bis (2,3 - epoxypropyl) methylamine; N,N - bis (2,3 - epoxypropyl) butylmethylammonium iodide; 1,4 - butylene-bis [N - (2,3 - epoxypropyl) - N,N - dimethylammonium iodide] and diglycidyl amines and amine salts having the general formula:

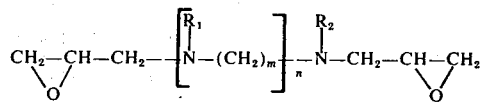

or

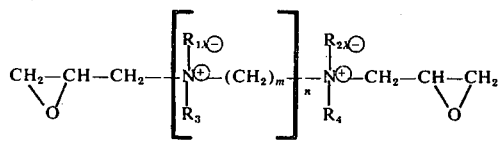

Where "m" is a positive integer of from 2 to 5, "n" is a positive integer from 0 to 5, $R_1$, $R_2$, $R_3$, and $R_4$ represent alkyl radicals having from 1 to 2 carbon atoms, and X represents bromide, iodide, arenesulfonate, or acetate ions.

6. A process according to claim 5 wherein the lignin solution is a solution containing from 30 to 40% lignin and is reacted at a temperature in the range of 75°C to reflux temperature at atmospheric pressure with the di-epoxide at a pH in the range of 9 to 11 to the extent that the phenolic hydroxyl content of the lignin is reduced by an amount of from 50 to 75%.

7. A process according to claim 6 wherein the lignin is a lignosulfonate solution.

8. A process according to claim 7 wherein the di-epoxide has a molecular weight in the range of 250 to 800 and is a diglycidyl ether of a polyol.

9. A process according to claim 8 wherein the di-epoxide is a diglycidyl ether of a polyalkylene glycol.

10. A process according to claim 9 wherein the di-epoxide is a diglycidyl ether of polyethylene glycol.

11. A process according to claim 6 wherein the lignin is an alkali lignin and the di-epoxide is a diglycidyl ether of polyethylene glycol.

* * * * *